UNITED STATES PATENT OFFICE

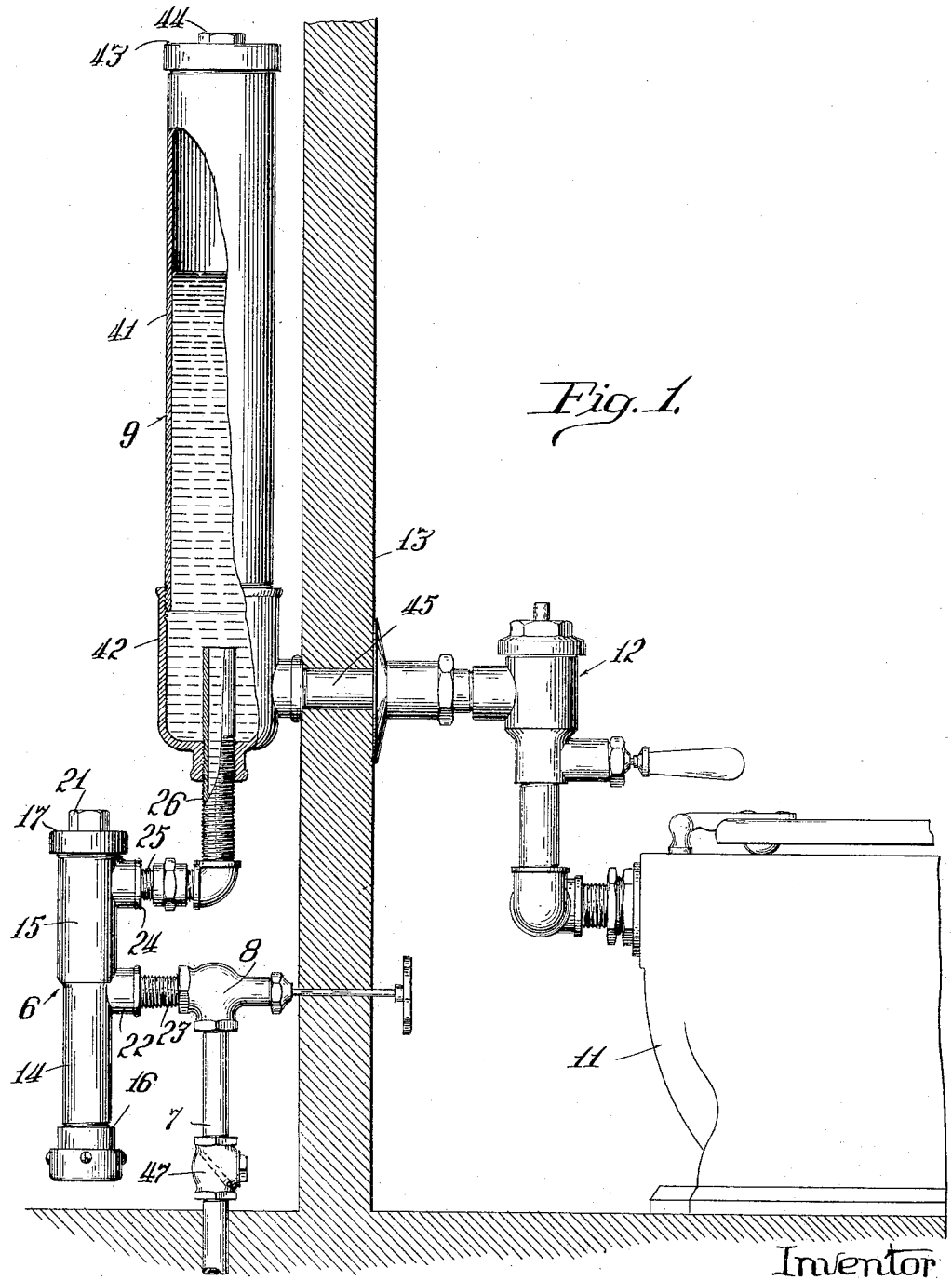

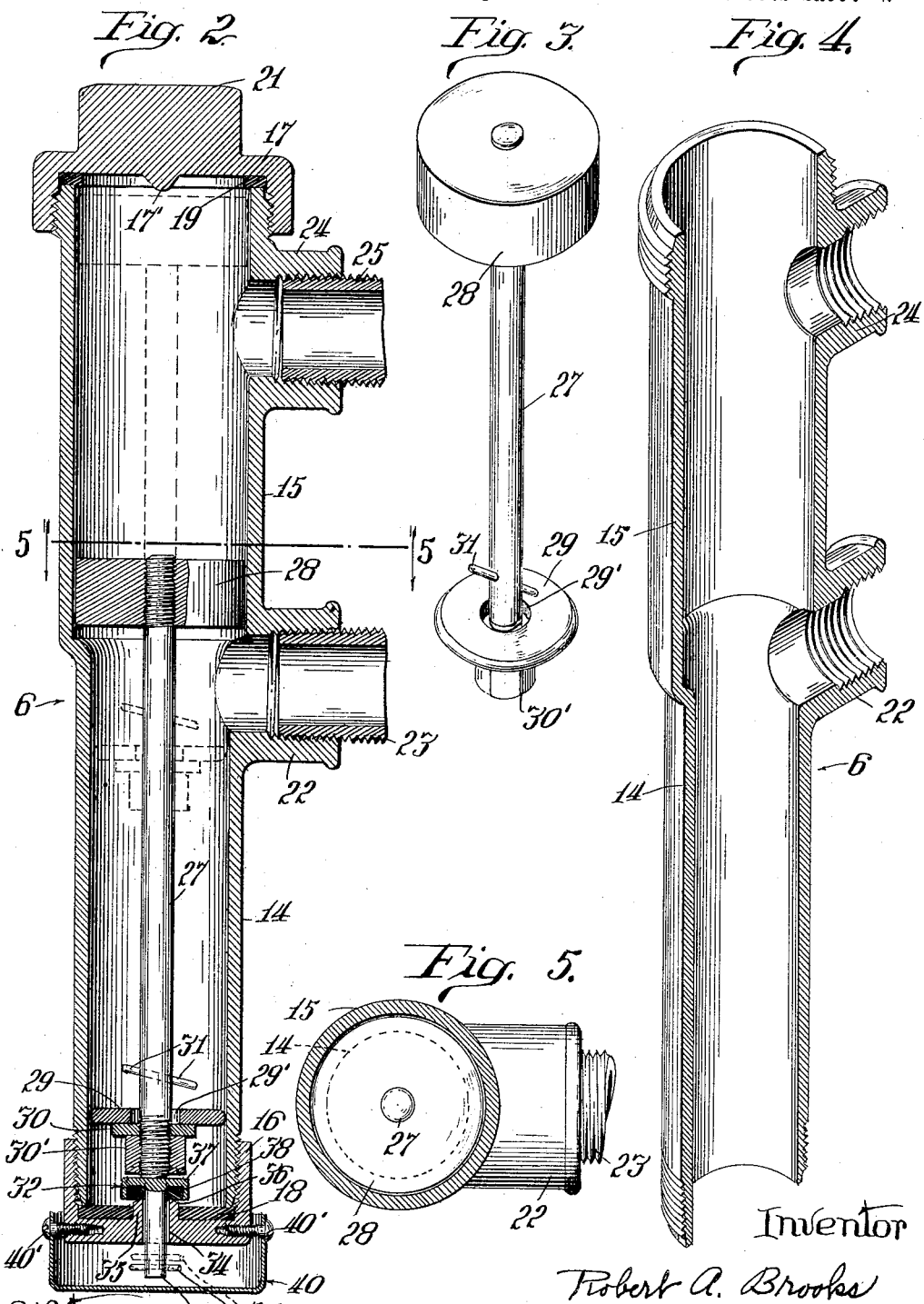

ROBERT A. BROOKS, OF CHICAGO, ILLINOIS

WATER COMPRESSION SYSTEM

Application filed September 3, 1929. Serial No. 389,919.

The present invention relates to improvements in compression systems for supplying water in homes, buildings, and to particular fixtures, and pertains more specifically to an improved air injector for use in connection with such systems. These compression or high pressure pneumatic systems generally comprise a compression tank which is supplied with water from the street main or other source of supply. The upper portion of such tank is normally sealed to have a volume of air trapped therein, which air is normally retained at the pressure of the water supplied to the tank. Such compression tank functions as a reservoir for holding a relatively large volume of water under pressure. This reservoir enables a large volume flow of water to be had under pressure, which may not be possible where the service fixture or outlet is connected directly with the supply inlet to the building, owing to the restricted size of such service inlet. One typical utility of these compression tanks is in connection with the flushing of a water closet, where a brief large volume flow of water under pressure is desired.

These compression systems also have the utility of maintaining an accumulation of water ready for instant use, notwithstanding a temporary failure of the source of supply from the street main or a considerable lowering of the pressure of this source of supply.

Notwithstanding the obvious advantages of these compression systems, they have not come into extensive use because of the difficulties and complications involved in permanently maintaining the desired volume of air in the upper portion of the compression tank. This trapped air is always subject to condensation, which continuously tends to diminish its volume. As a consequence of this gradual and continuous loss of air over a period of time, the water level gradually works up until the tank is water-logged, i. e., there is such a small volume of air in the tank that it is impossible to obtain a flow of large volume from the tank for an appreciable time interval. To replenish the volume of air in the compression tank by a manually operated air pump is objectionable for various reasons; it requires the attendance of the householder and the volume of air is then always subject to wide variations; the householder frequently does not know the cause of the trouble when the compression tank becomes water-logged; and if the compression tank is in a remote or inaccessible location it is necessary to extend an air line to it. To replenish the volume of air by an electrically operated air pump is objectionable because it involves elaborate control apparatus and an expensive installation.

The primary object of my invention is to avoid all of these objections to prior forms of compression systems by providing a system wherein the replenishment of air in the compression tank occurs automatically and regularly in the operation of the system, without the necessity of expensive equipment or the supervision or operation by the householder or attendant. In its broad aspect, my invention contemplates a device for injecting air into the compression tank which functions in the nature of a fluid motor responsive to water flow in the system. More specifically, this device responds to the inlet flow of water to the compression tank, whereby atmospheric air is drawn into a chamber of the injector in the operation of supplying water to the compression tank, which air is then introduced into the upper part of the tank. Such operation occurs automatically each time that an appreciable volume of water is drawn from the compression tank and, hence, an ample volume of air is always retained in the upper portion thereof. However, the air pressure can never exceed the pressure of the water supply to the tank, nor can an excessive volume of air accumulate and remain in the tank. The invention also embodies other specific improvements concerned with the construction of the injector, the manner in which sediment and other refuse is prevented from accumulating therein, etc.

In the particular embodiment chosen for illustrating the invention, I have shown the compression tank as serving to supply water to a water closet flushing apparatus, but it will be understood that while such adaptations represent one of the particular utilities of my invention, such is merely exemplary and that the invention may be embodied in large systems, having large compression tanks supplying a multiplicity of outlet fixtures of different types.

In the accompanying drawings illustrating such embodiment:

Figure 1 is a side elevational view of a typical water closet installation, with the compression tank partly broken away in section;

Figure 2 is a longitudinal sectional view of the improved air injector on a larger scale, illustrating in full lines the plunger member in its lower or normal position with the air inlet valve closed, and illustrating in dotted lines such plunger member in its raised position with the air inlet valve open;

Figure 3 is a perspective view of this plunger member;

Figure 4 is a perspective sectional view of the casing portion of the air injector; and Figure 5 is a sectional view taken on the plane of the line 5—5 of Figure 2.

Referring to Figure 1 of the drawings, 6 indicates my new air injector as a whole, 7 the water supply pipe from the street main or other source of water supply, 8 the shut off valve in the line coming in from the main, 9 the compression tank as a whole, 11 a portion of a water closet bowl, 12 an ordinary flushing valve for the water closet, and 13 a partition wall of a building.

As best shown in Figure 2, my improved air injector 6 comprises a hollow cylindrical casing, the lower section 14 of which is of smaller diameter than the upper section 15 thereof. Said casing is externally threaded at its lower and upper ends, and such ends are closed by suitable internally threaded caps numbered respectively 16 and 17. Between the cap 16 and the lower end of the casing section 14 is interposed a suitable washer 18 for sealing the connection between the cap and casing, and a washer 19 is interposed between the upper end of the casing and the cap 17 for the same purpose, as will be readily understood. The upper cap 17 is provided with an hexagonal head 21 so that said cap may be easily removed with a wrench to obtain access to the parts in the interior of the casing.

The lower section 14 of the casing 6 is provided adjacent to its upper end with a water inlet in the form of an integral laterally disposed sleeve 22, provided with interior screw threads, into which is threaded one end of a nipple 23 the opposite end of which, in the illustrated construction, is connected with the cut-off valve 8. The upper section 15 of the casing 6 is provided near its upper end with a water discharge outlet also in the form of an integral laterally disposed sleeve 24, also screw threaded on its interior, into which is threaded a nipple 25, which is connected by suitable couplings with a pipe 26 suitably threaded into the lower end of the compression tank 9.

It will be seen from the foregoing that the water from the street main or other source of supply passes through the air injector to the compression tank.

Operating within the air injector casing 6 is a longitudinally extending plunger rod 27 upon the upper end of which, as shown in Figure 2, is threaded a piston or plunger 28, which as shown in full lines in said figure is normally disposed at the lower end of the upper casing section 15. Upon the lower end of said plunger rod is mounted a second piston or plunger member 29. The latter rests loosely on a nut 30 screwing over the threaded lower end of said plunger rod. A lock nut 30' also screwing over the plunger rod secures the nut 30 in its proper setting on the rod. On the downward movement of the plunger unit the plunger member 29 is adapted to lift off of the nut 30 and assume an angular position in the bore of the casing so that any sediment in the bottom of the casing can readily slip by said plunger member, as will appear later in the description of the operation. In order that this plunger member can assume such angular position, it is provided with a central opening 29' of larger diameter than the plunger rod, and the peripheral edge of the plunger member is rounded in cross section to have substantially only a line contact with the bore of the casing. Hence, there is no binding the plunger member either on the plunger rod or in the bore of the casing which can prevent the plunger member from tilting at an angle to the rod.

A stop pin 31 extends transversely through the plunger rod in spaced relation above the normal position of the plunger member 29 for limiting the upward movement of the latter and this stop pin is inclined to tilt the plunger member, as above described. This lower plunger member has a rather snug fit with the bore of the casing when traveling upwardly, and the upper plunger member has a rather loose fit in the upper larger bore 15, and, if desired, this upper plunger member may be provided at spaced points with shallow longitudinally extending ribs thereon to serve as guiding surfaces. The entire plunger unit functions as the movable element of the water operated air injector. The upper cap 17 of the air injector casing 6 is provided with a downwardly extending teat 17', which acts as a stop for the upper plunger 28 in its upward movement under the force of the water coming in from the street main, so that said plunger will not come into contact with washer 19 which might otherwise prevent the plunger from going back to normal position when the flow of water through the casing stops.

The air intake check valve, indicated as a whole by the reference numeral 32 in Figure 2, comprises a stem 33 which passes loosely through a suitable opening 34 provided for that purpose in the lower cap 16 of the casing 6, which cap is provided around said opening with an upwardly extending integral sleeve 35, the upper end of which is tapered as shown at 36 to form a seat for the plunger of the air valve, said plunger being indicated by the numeral 37.

The plunger 37 is provided on its under surface with a washer 38 of soft rubber or some other material suitable for the purpose, which, when the air valve is closed, will prevent leakage of water and air back through said valve. The air valve 32 is held in normal closed position by the weight of the plunger rod 27 and the two plungers 28 and 29 carried thereby, as shown in Figure 2. Upward movement of the air intake valve 32 beyond a predetermined point is prevented by a stop pin 39 which extends through the stem 33 a short distance below the cap 16 and contacts with the lower surface of said cap when the valve is opened. The open position of the valve is shown in dotted lines in Figure 2.

A cup-shaped drip receptacle 40 is secured to the cap 16 by screws 40' passing through the upper edge of the receptacle and threading into the cap 16. The upper edge of this receptacle extends upwardly in spaced relation around said cap to a level above the bottom of the cap. Any water leakage down through the air inlet valve passage 34 accumulates in this drip receptacle, and if the level therein should rise to the bottom of the cap 16 the inflow of air through the passage 34 will suck water in with it so that there is no possibility of the drip receptacle overflowing. Such drip receptacle can be dispensed with in many cases where any small dripping is of no consequence or where such can be drained away.

The compression tank 9 is shown as formed in two sections, a comparatively long upper section 41 and a short lower section 42. The upper section 41 of the tank is shown as threaded into the lower section 42 thereof, but, of course, any suitable means for joining the two sections of the compression tank may be provided. The upper end of the tank 9 is closed by a cap 43 provided with an hexagonal head 44 for the reception of a wrench when it is desired to remove said cap for any purpose. As shown in Figure 1, the upper end of the pipe 26 within the tank 9 terminates somewhat above the water discharge outlet 45 leading from said tank to the water closet or to the water system of the building in which the device is installed. This pipe 26 is extended above said water discharge outlet 45 so that the air delivered to the compression tank from the injector will not be drawn out with the discharging water when it leaves the compression tank on account of the velocity of discharge during operation. The water discharge outlet 45 is located above the bottom of the compression tank to define a sediment collecting chamber. By this arrangement any excess sediment cannot return through the pipe 26 but instead is swept out through the outlet pipe 45.

The operation of the device is as follows:

When the shut-off valve 8 is opened and water under pressure of say one hundred pounds is turned into the system from the street main or other source of supply, such water enters the casing 6 through the sleeve 22, and such water will move the plunger unit upwardly because of the differential areas of the two piston heads 28 and 29 and because of the lowering of pressure above the upper head, until such plunger unit reaches the position shown in dotted lines in Figure 2, in which position the upper plunger 28 will be above the water discharge outlet 24 leading from the air injector casing to the compression tank. The plunger unit will remain in such position until all flow of water up into the compression chamber has ceased, which will follow when the air in the compression tank is compressed to one hundred pounds pressure, or to the pressure of the incoming water supply from the street main or other source. This plunger unit will then, owing to its weight, recede by gravity to its normal lower position, the lower plunger member 29 resting on the air intake check valve 32, thereby insuring positive seating of the plunger 37 on the valve seat 35. This operation fills the system with water and compresses the air in the upper end of the compression tank to the same pressure as the water in the street main. Now, if the flushing valve 12 shown in the illustrated construction, or some other outlet fixture connected in the system, is opened and water is withdrawn from the compression tank 9, the above operation is repeated, and in its upward movement the lower plunger member 29 will create a suction in the bottom of the lower casing section 14, opening the air intake valve and drawing air therethrough into said casing section.

The plunger member 29 will, in this relatively quick upward stroke, have sufficient sealing engagement with the nut 30 and with the casing wall to create this suction. As soon as the plunger unit reaches its upper position, shown in dotted lines in Figure 2, the suction created by the lower plunger member in the lower section of the casing will cease and the air intake valve will close. After the valve 12 or other water outlet in the system is shut off, the pressure throughout the system equalizes and the air in the section 14 of the casing will naturally be displaced by water passing down around the lower plunger member so that this air will pass upward around the lower and upper plungers as they recede to their normal lower position, passing through the outlet 24 and pipe 26 into the compression tank and then flowing upward through the water in said tank to the space above the water level therein. The lower plunger 29 may not draw air into the chamber 14 throghout its entire stroke but will draw a sufficient quantity of air into said chamber upon each operation of the plungers to prevent the compression tank from filling up with water through condensation and thereby becoming waterlogged. In the upward travel of the lower plunger member 29 a certain amount of the incoming water from the street main will pass by said plunger and down into the lower section of air chamber 14 of the casing, but such amount as does pass by said lower plunger will have no detrimental effect on the operation of the air injector, since the air will readily pass upward through this water.

The rate of leakage of the water down around the lower plunger 29 may be regulated as desired by properly proportioning the size of this plunger. It will be observed that at no time in the operation of the apparatus can the air be compressed in the compression tank to a greater degree of pressure than the initial pressure of the water coming from the street main, and the volume of air discharged into the tank from the air injector is automatically controlled when the flushing apparatus 12 or any other fixture in the system is used. In the down stroke of the plunger unit, the lower plunger member 29 will move up against the pin 31 and take its inclined position so that all grit and sediment will be swept up around said plunger member and past the loose fitting upper plunger member into the compression tank. Hence, there is no possibility of the device becoming bound or clogged by sediment. Any tendency to accumulate a large volume of air in the compression tank than is desired is prevented by such air blowing out through the outlet 45 upon the operation of the system. A check valve 47 may be located in the service inlet pipe 7 so that the accumulated water and pressure will be held in the compression tank if the service pressure should fail.

It will be seen from the foregoing that by the use of my improved air injector a sufficient volume of air is automatically retained in the compression tank at all times, thus doing away with the use of manually operated or electrically controlled pumps for that purpose.

As previously stated, while I have shown my improvements in connection with a water closet bowl and flushing apparatus therefor, this is merely illustrative of one adaptation employing only a single water outlet from the compression tank, and it is to be understood that my invention is not limited to this use but is also adapted for use in serving large water systems containing any number of water outlet fixtures of various kinds, since the device will operate just the same upon the opening of an ordinary water tap or faucet as it will with a water closet flushing apparatus.

While I have shown a preferred embodiment of my invention in the accompanying drawings, it is to be understood that I do not wish to limit myself thereto. It will be understood that various changes may be made from the construction shown without departing from the essence of the invention.

I claim:

1. The combination with a water system comprising a compression tank having inlet and outlet connections, of means in said inlet connection for automatically supplying air to said tank, said means comprising a casing, an air intake check valve for admitting air to said casing, and a motor element in said casing operated by the passage of water through said casing for causing air to be introduced into said casing through said air intake check valve.

2. The combination with a water system comprising a compression tank having inlet and outlet connections, of means in said inlet connection for automatically supplying air to said tank, said means comprising a casing, an air intake check valve for admitting air to said casing, and a plunger in said casing operated by the passage of water therethrough for drawing air into said casing through said air intake check valve.

3. The combination with a water system comprising a compression tank having inlet and outlet connections, of means in said inlet connection for automatically supplying air to said tank, said means comprising a casing having upper and lower sections of different diameters, and differential area motor means in said casing operated by the water passing through said casing for causing air to be introduced into said tank.

4. The combination with a water system comprising a compression tank having inlet and outlet connections, of means in said inlet connection for automatically supplying air to said tank, said means comprising a casing, a plunger in said casing adapted to be operated by the passage of water through said casing, and suction means connected with said plunger for drawing air into said casing.

5. The combination with a water system comprising a compression tank having inlet and outlet connections, of means in said inlet connection for automatically supplying air to said tank, said means comprising a casing, inlet and outlet openings in said casing for the passage of water therethrough, an air inlet connection to said casing, a plunger in the upper portion of said casing operated by the passage of water through the casing, and a lower plunger connected to said upper plunger and operated thereby for drawing air into said casing, said plungers being of different areas.

6. The combination with a water system comprising a compression tank having inlet and outlet connections, of means in said inlet connection for automatically supplying air to said tank, said means comprising a cylindrical casing having upper and lower sections, inlet and outlet openings in said casing for the passage of water therethrough, an air inlet connection to said casing, a plunger in the upper section of said casing operated by the passage of water through said casing, a lower plunger for drawing air into said casing, and means connecting said plungers permitting said lower plunger to tilt at an angle to said casing.

7. The combination with a water system comprising a compression tank having inlet and outlet connections, of means in said inlet connection for automatically supplying air to said tank, said means comprising a cylindrical casing having upper and lower sections, inlet and outlet openings in said casing for the passage of water through said casing, an air inlet opening into said casing, upper and lower plungers in said upper and lower casing sections, a rod extending between said plungers, and means for connecting said lower plunger with said rod whereby said latter plunger remains at right angles to said rod in the upward stroke and is capable of tilting angularly thereto in the downward stroke.

8. The combination with a water system comprising a compression tank having inlet and outlet connections, of means in said inlet connection for automatically supplying air to said tank, said means comprising a cylindrical casing comprising upper and lower sections, inlet and outlet opening in said casing for the passage of water therethrough, an air intake check valve in the lower end of the lower section of said casing, a plunger in the upper section of said casing operated by the passage of water through said casing, a lower plunger connected to said upper plunger and operated thereby for creating a suction in the lower section of said casing for opening said air intake check valve for admitting air into said casing, and a drip receptacle below said check valve arranged whereby when a predetermined accumulation of water collects in said receptacle such water is sucked back into said casing through said check valve.

9. The combination with a water system comprising a compression tank having inlet and outlet connections, of a chamber and a member therein operated by the pressure of the water at the inlet connection of said system for effecting a displacement of the member in said chamber, such displacement of said member operating to draw air into the system.

10. The combination with a water system comprising a compression tank having inlet and outlet connections, of a chamber and a member therein operated by the initial flow of the water through the inlet connection into said chamber for effecting a displacement of the member, the displacement of said member under such initial flow of water supplying air to said chamber.

11. The combination with a water system comprising a compression tank having inlet and outlet connections, of means in said inlet connection for automatically supplying air to said tank, said means comprising a casing, an air inlet connection to said casing, and a plunger in said casing movable by the initial passage of water through the casing to open said air inlet connection to admit air to said casing.

In witness whereof, I hereunto subscribe my name this 26th day of August, 1929.
ROBERT A. BROOKS.